United States Patent [19]

Lenhart

[11] 4,369,005
[45] Jan. 18, 1983

[54] AIR CONVEYOR

[75] Inventor: Ronald A. Lenhart, Lakewood, Colo.

[73] Assignee: Precision Metal Fabricators, Inc., Arvada, Colo.

[21] Appl. No.: 211,248

[22] Filed: Nov. 28, 1980

Related U.S. Application Data

[63] Continuation of Ser. No. 17,232, Mar. 5, 1979, abandoned, which is a continuation-in-part of Ser. No. 947,441, Oct. 2, 1978.

[51] Int. Cl.³ .............................................. B65G 53/20
[52] U.S. Cl. ................................................... 406/88
[58] Field of Search ........................... 406/86, 88, 181

[56] References Cited

U.S. PATENT DOCUMENTS

| 3,105,720 | 10/1963 | Barker | 406/88 |
| 3,953,076 | 4/1976 | Hurd | 406/88 |
| 4,010,981 | 3/1977 | Hodge | 406/88 |

Primary Examiner—Robert B. Reeves
Assistant Examiner—Gene A. Church
Attorney, Agent, or Firm—Max L. Wymore

[57] ABSTRACT

Air actuated conveyor for containers using air jets and utilizing the containers as valving means while providing a positive air pressure therebetween to maintain the containers separated during conveyance. The single container speed within the conveyor and the speed of the serially configured container train are selectively controllable essentially independent one from the other.

27 Claims, 7 Drawing Figures

AIR CONVEYOR

This is a continuation of application Ser. No. 017,232, filed Mar. 5, 1979, now abandoned, which is a continuation-in-part of U.S. application for Letters Patent Ser. No. 947,441 filed Oct. 2, 1978.

BACKGROUND OF THE INVENTION

Air conveyors have been used for conveying various kinds of particulate material and packages, cans or similar articles.

One of the disadvantages of existing conveyors is that the articles, packages, cans and the like where high volume of articles moved is desired, are subjected to damage caused by the articles colliding with one another due to the high velocities the articles reach because of the manner in which the air is used.

SUMMARY OF THE INVENTION

According to the invention the air conveyor is principally one used for the horizontal, but need not be for, transfer of cans and the like. The conveyor proper is comprised of an inverted U-shaped channel with the top being closed and the bottom being open. The bottom is provided with a pair of inwardly extending lips or guides upon which the cans move or roll. The sides or legs of the channel are provided with a plurality of jet openings slanted in the direction of transport and positioned above the lips a distance sufficient to direct a jet of air against the can ends slightly above a line through the center of the cans. The jet openings are connected to a source of air under pressure as by means of a plenum to either side of the channel communicating the jet openings. The channel is sized, with respect to the cans to be conveyed, such that there is only a relatively small space between the top and sides of the channel and the cans. The jet openings are sized and slanted such that air introduced therethrough will provide a sufficient positive pressure above and between the cans with respect to the ambient atmosphere to provide and maintain the cans spaced from the top of the channel and from each other while being moved through the conveyor.

DESCRIPTION OF PREFERRED EMBODIMENT

This application is a continuation-in-part of applicant's copending application Ser. No. 947,441 filed Oct. 2, 1978, for AIR TRANSPORT SYSTEM and applicant's application is incorporated by reference herein for purposes of support and explanation.

Figure 1:
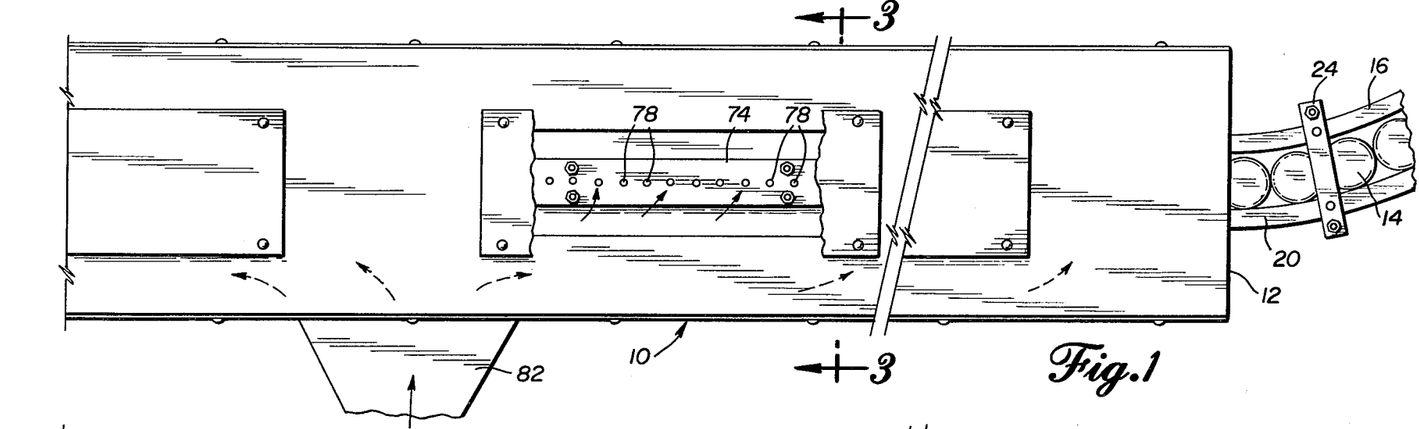
FIG. 1 is a view in elevation, with portions broken away to conserve space, of a length of the improved air conveyor and a section broken away to show internal construction.
Figure 2:
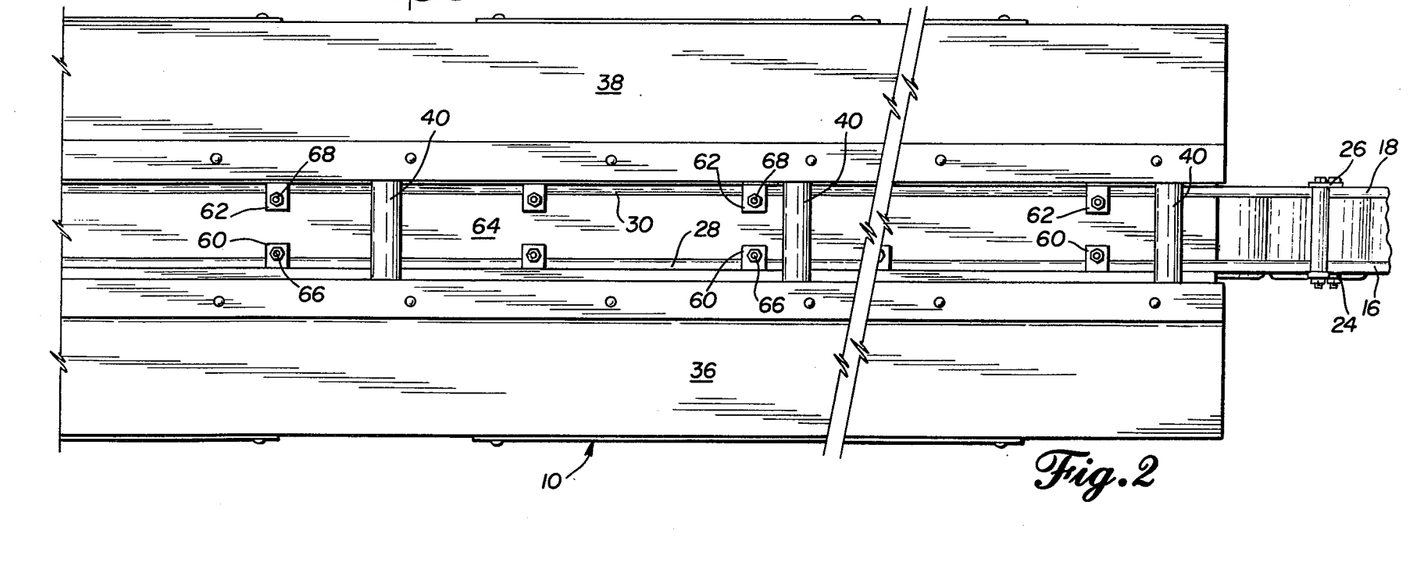
FIG. 2 is a top plan view of the air conveyor with portions broken away to conserve space.

Referring to FIGS. 1 and 2 of the drawings, the improved conveyor is shown as essentially a horizontally positioned U-shaped channel 10 although the channel may be inclined above the horizontal and would not ordinarily be used in a vertical position but could be. The inlet end 12 of the conveyor 10 is fed cans 14 from an elevator output such as that identified by reference numeral 70 in FIG. 2 of applicant's copending application, supra. The cans may be gravity fed from the elevator output via upper and lower guide rails shown as 16, 18 and 20, 22, respectively, supported in spaced relation to either end of the cans 14 as by spacing elements 24 and 26.

Figure 3:
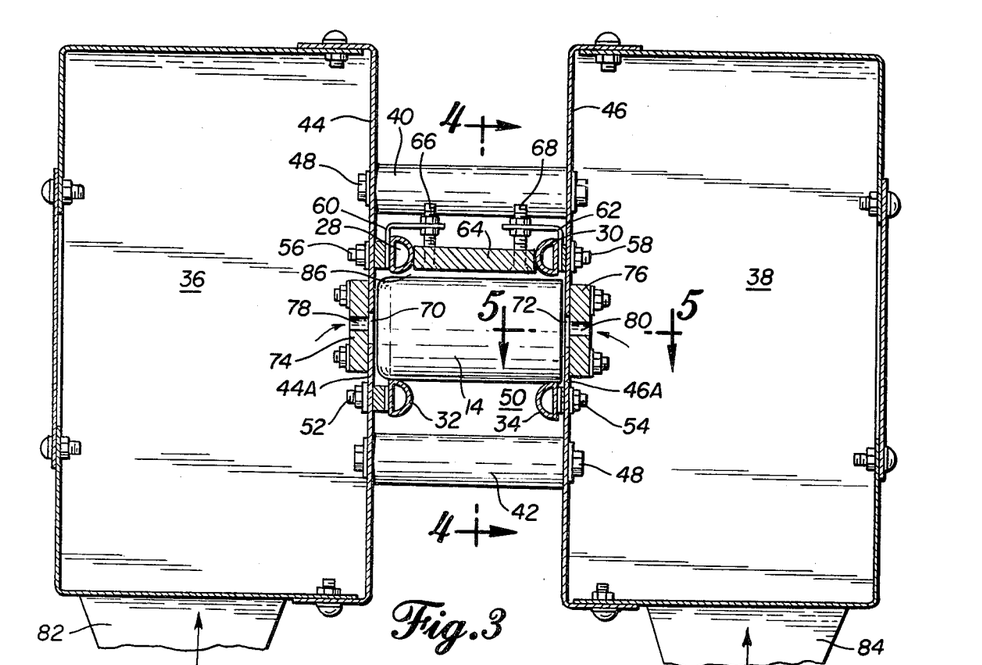
FIG. 3 is a cross sectional view in elevation of FIG. 2 along line 3—3 to an enlarged scale.
Figure 4:
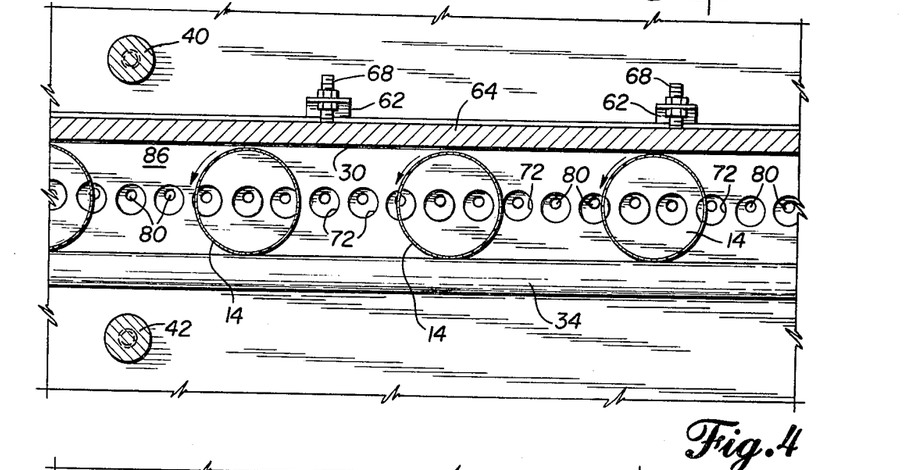
FIG. 4 is a cross sectional view in elevation along line 4—4 of FIG. 3.
Figure 5:
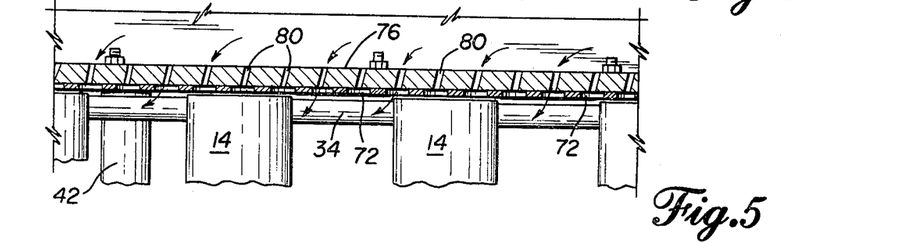
FIG. 5 is a cross sectional plan view along line 5—5 of FIG. 3.

Referring more particularly to FIG. 3, the guide rails 16, 18 and 20, 22 connect respectively with guides 28, 30 and 32, 34. The support structure for the guides and channel is seen to be by means of an elongated plenum chamber 36 and 38 positioned to either side of the guides and having sides 44 and 46 secured together in spaced relation throughout the length thereof by a plurality of spacer elements 40 and 42 secured to a side 44 and 46 of each plenum chamber 36 and 38 by means of bolts 48 and the like. The sides 44 and 46 of the plenum chamber are also seen to be common to the U-shaped channel or chamber 50 of the conveyor and are each seen to form a side thereof identified as 44A, and 46A, respectively. The lower guides 32 and 34 are secured to sides 44A and 46A by means of a stud and nut 52 and 54 while upper guides 28 and 30 are secured thereto by means of a stud and nut 56 and 58. L-shaped brackets 60 and 62 are supported on the studs and nut 56 and 58 and in turn support the top 64 of the channel between guides 28 and 30 in closed relation. The top is supported on the brackets by means of bolts and nuts 66 and 68 which provide for vertical adjustment and positioning of the top with respect to the guides and the can 14.

A plurality of holes 70 and 72 are provided in the sides 44A and 46A of the U-shaped channel in spaced serial relation essentially parallel to the longitudinal dimension. Jet boards 74 and 76 are secured to sides 44A and 46A by suitable means such as bolts and the like and positioned to register with holes 70 and 72. The jets boards are provided with jet openings 78 and 80 therethrough to coincide with holes 70 and 72. The jet openings are preferably located above the centerline of the container and normally positioned at an angle to direct air passing therethrough from the plenum chambers 36 and 38 to chamber or channel 50 in a downstream direction. The angle of the jets for reference sake will be referred to as the angular deviation from a line normal to the surface of the jet board, with 0° being at right angles thereto.

Air is introduced into the plenum chambers 36 and 38 via conduits 82 and 84 connected to a suitable blower or blowers, not shown. Air at a positive static pressure is forced through the plenum chambers and the connecting jet openings into the U-shaped conveyor channel 50. The angles of the jet openings may be uniform throughout the length of the conveyor or they may be selectively of varied angles to provide a desired result. In transporting a 12 fluid ounce aluminum can horizontally, the angle of the jet openings are found to be preferably from about 8° to about 11° from the normal although angles from 5° to 50° may find utility with other and various cans and containers. The containers are preferably of cylindrical shape although variations therefrom may be made with suitable changes in the conveyor.

The jets are positioned in a vertical direction in the jet boards such as to be, with the cans at rest, slightly above the centerline of the cans. The air being introduced into the U-shaped channel from each plenum 36 and 38 through the jet openings 78 and 80 is of such velocity and volume to provide lift to the cans such that they barely ride on or slightly above the guides 32 and 34 and a positive pressure with respect to and greater than the ambient atmosphere is produced and maintained of at least 0.02 inches of water or 0.00072 psi in the channel space 86 above and between the cans. For a 12 ounce aluminum can, i.e. an aluminum can which will hold 12 fluid ounces, jet angles are preferably about 8° to about 11° from the normal to the longitudinal dimension of the U-shaped channel and with a static pressure in the plenum chambers 36 and 38 of from about 1.0 inches of water to about 3.0 inches of water and the jet openings 78 and 80 should preferably be about ¼ inch diameter up to about ⅜ inch with an intermediate preferred range of from about 7/32 inch to about 11/32 inch but may be about ⅛ inch up to about ¾ inch for conveying other and various cans and containers. For jet openings ¼ inch or larger, the velocity of air issuing from a jet is not increased by increasing the size of the jet opening but the volume of air (CFM) may be increased and the attendant energy.

Figure 6:
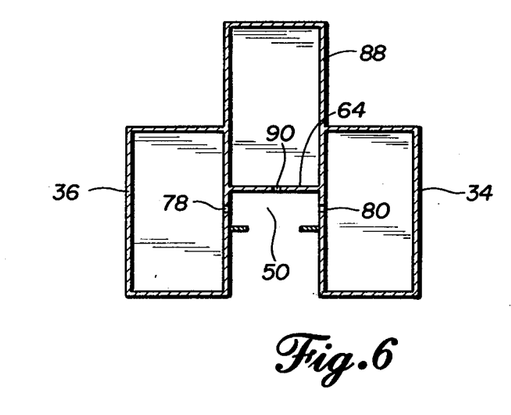
FIG. 6 is a diagrammatic illustration of a supplemental air supply arrangement; and, FIG. 7 is a diagrammatic illustration of the conveyor of this invention being used to merge several different sources of containers with one feed line.

Two forces are utilized to produce the desired end result of transporting containers along the horizontal while maintaining a spacing therebetween and yet provide for maximum throughput or storage of containers while avoiding surges during transport. A force is applied to the cans by the air jets impinging on the ends of the cans and as well a force is applied by the very volume (CFM) of air introduced into the channel. These forces need to be balanced for best operation of the conveyor. If the forces applied to the containers by the velocity transport component of the air jets and the volume transport component is excessive compared to the volume (CFM) pressure component, the cans will close up resulting in unwanted can-to-can contact. The pressure above and between the cans must be established and maintained significantly greater than ambient pressure of at least 0.02 inches of water or 0.00072 psi. This is accomplished by selection of the appropriate jet angle, jet size and static pressure of the air supply for a particular container. Generally the greater the angle that the jet opening assumes with respect to a line normal to the longitudinal dimension of the U-shaped channel, the significantly greater the volume (CFM) that is required to maintain the greater than ambient pressure in the space 86 between the containers and the top 64 of the channel. Where the volume of air introduced into space 86 is not sufficient to keep the containers separated, a supplemental volume of air may be introduced into the space 86 as by means of another plenum chamber 88 with an opening or openings 90 in top 64 along the length thereof, see FIG. 6.

A fairly close spacing must be maintained between the top 64, sides 44A, 46A and the can 14, being preferably not greater than about ⅛ inch for a 12 ounce aluminum can. A spacing of as much as one quarter of an inch while not the preferred, may be satisfactory in certain applications.

As indicated above, air jet angles can be used up to as great as about 50°; however, this will require a higher volume of air either by using larger jet diameters or by using supplemental air introduced between the cans 14 and the top 64 to keep the cans separated in transport. If the force applied to the cans by the jet transport vector is greater than the pressure between the cans, the cans will close up.

The jet angle, size, and static pressure in the plenum are chosen to provide substantially uniform greater than ambient pressure by about 0.02 inches of water or 0.00072 psi throughout the can train. By using air jets at different angles and sizes along the can train, selected variations of pressure can be selectively provided.

As will be explained later in greater detail, the angle of the jet openings may be variable or may be different in different sections of the conveyor for the purposes to be explained. Such variation will permit the transport of differing number of cans per foot and thus will allow merging cans from one source with cans from a different source into one train.

Reference is now made to the tables wherein data is presented of the several variables that have been made in the method and apparatus of this invention illustrating, and not by way of limitation, examples of the practice of the invention. All of the data was recorded in the transport of a 12 ounce aluminum can and it will be obvious to one skilled in the art that certain changes will need to be made where other and different size and weighted cans or containers are conveyed in accordance with the invention.

Tables VI through IX, for example, show data resulting from the use of a jet angle of 9° from normal with jet sizes ranging from 7/32 inch to 5/16 inch in diameter. For example in Table IX, the use of a 5/16 inch diameter jet at an angle of 9° provided the best operation with an average cubic feet per minute of air per jet of 1.85 CFM providing an average jet vector transport velocity of 555 FPM at a static pressure of 1 inch water at the open end of the cans and 1.3 inch water at the closed end. The static pressure in the top under dynamic operating conditions between the cans was 0.05 inch water and between the top and a can 0.14 inch water to provide a delivery of 950 cans per minute with a speed of 216 feet per minute for the can train while the maximum attainable speed of a single can was 266 FPM, i.e. Table IX, item C, shows 950 CPM @ 4.4 CPF gives 216 FPM as the speed of the can train while the speed of a single can is 266 FPM under the same conditions. It is an important aspect of the present invention that the single can speed may be attained and maintained over great distances without the usual expected increase in speed. The conveyor provides graduated speed control, either an increase, or decrease. The speed of a single can may be selected for the desired recovery time of the can train, see Table XVIII. Thus, the conveyor provides means for controlling and regulating the gentleness in one can overtaking another while still maintaining the capability of moving the can train at the desired CPM production rate. With the improved conveyor of this invention the cans can be conveyed in mass, as a continuous train or on an intermittent basis with the desired gentleness for the article being conveyed. The conveyor may be completely emptied of cans and when the flow is released, the conveyor will fill at the single can per foot rate and then resume the desired can train production rate. It is important to note that the static pressure in the plenum adjusts for cans being conveyed. The cans can be stopped completely in the conveyor without adverse effects and because there is a complete absence of moving belts, ropes, cables to convey the cans, burnishing, marking and the like thereof will not occur. The safety of the operation is also greatly enhanced. With the constant pressure on the cans, the conveyor may be started up at full production rate, unlike mechanical conveyors which have to be brought up to speed gradually. The noise levels are very substantially reduced because of the separation of the cans with air such that damage to cans is eliminated.

TABLE I

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 7/32 | 8 | 1" | 1.0 | 1.4 | 400 | 91 | 142 | .96 | 3723 | 517 | .05 | .14 | poor |
| 7/32 | 8 | 1" | 1.2 | 1.6 | 500 | 114 | 130 | 1.04 | 4022 | 559 | .02 | .07 | poor |
| 7/32 | 8 | 1" | 1.4 | 1.8 | 800 | 182 | 176 | 1.11 | 4301 | 597 | .05 | .13 | fair |
| 7/32 | 8 | 1" | 1.6 | 2.0 | 750 | 170 | 181 | 1.18 | 4563 | 634 | .05 | .13 | fair |

NOTE:
Tables I through XII are based upon using a 2.625 inch can diameter with 4.4 cans per linear foot

TABLE II

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| ¼ | 8 | 1" | .9 | 1.3 | 550 | 125 | 120 | 1.21 | 3561 | 494 | .04 | .11 | poor |
| ¼ | 8 | 1" | 1.0 | 1.5 | 525 | 119 | 153 | 1.26 | 3723 | 517 | .05 | .11 | fair |
| ¼ | 8 | 1" | 1.2 | 1.7 | 575 | 131 | 162 | 1.36 | 4022 | 559 | .05 | .12 | fair |
| ¼ | 8 | 1" | 1.4 | 2.0 | 725 | 165 | 203 | 1.50 | 4452 | 616 | .05 | .12 | fair |

TABLE III

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 17/64 | 8 | 1" | 1.0 | 1.4 | 975 | 222 | 187 A | 1.41 | 3723 | 517 | .06 | .12 | good |
| 17/64 | 8 | 1" | 1.2 | 1.6 | 975 | 222 | 206 | 1.52 | 4022 | 557 | .06 | .12 | good |
| 17/64 | 8 | 1" | 1.4 | 1.8 | 975 | 222 | 226 A | 1.63 | 4301 | 597 | .06 | .15 | good |
| 17/64 | 8 | 1" | 1.6 | 2.0 | 1075 | 244 | 285 | 1.73 | 4563 | 634 | .06 | .15 | fair |

TABLE IV

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 9/32 | 8 | 1" | .9 | 1.2 | 850 | 193 | 230 B | 1.46 | 3400 | 472 | .07 | .10 | very good |
| 9/32 | 8 | 1" | 1.1 | 1.5 | 875 | 199 | 230 | 1.66 | 3873 | 538 | .07 | .10 | very good |
| 9/32 | 8 | 1" | 1.4 | 1.7 | 950 | 216 | 292 | 1.79 | 4161 | 578 | .10 | .16 | good |
| 9/32 | 8 | 1" | 1.6 | 1.9 | 975 | 222 | 333 A | 1.90 | 4432 | 616 | .10 | .16 | good |

TABLE V

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 19/64 | 8 | 1" | .9 | 1.2 | 650 | 148 | 214 | 1.63 | 3400 | 472 | .05 | .10 | good |
| 19/64 | 8 | 1" | 1.1 | 1.4 | 750 | 170 | 226 | 1.78 | 3723 | 517 | .05 | .10 | good |
| 19/64 | 8 | 1" | 1.3 | 1.6 | 825 | 188 | 285 | 1.93 | 4022 | 559 | .05 | .11 | good |
| 19/64 | 8 | 1" | 1.5 | 1.8 | 900 | 204 | 285 | 2.06 | 4301 | 594 | .05 | .11 | fair |

TABLE VI

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 7/32 | 9 | 1" | 1.0 | 1.3 | 0 | | | .96 | 3723 | 580 | | | poor |
| 7/32 | 9 | 1" | 1.2 | 1.7 | 675 | 153 | 218 | 1.04 | 4022 | 627 | | | poor |
| 7/32 | 9 | 1" | 1.4 | 2.0 | 850 | 193 | 255 B | 1.15 | 4432 | 691 | | | fair |
| 7/32 | 9 | 1" | 1.7 | 2.2 | 875 | 199 | 307 | 1.21 | 4685 | 730 | | | fair |

TABLE VII

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| ¼ | 9 | 1" | .9 | 1.2 | 725 | 165 | 222 | 1.21 | 3561 | 555 | | | fair |

TABLE VII-continued

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| ¼ | 9 | 1" | 1.1 | 1.4 | 775 | 176 | 266 | 1.26 | 3723 | 580 | .06 | .10 | fair |
| ¼ | 9 | 1" | 1.3 | 1.6 | 825 | 188 | 266 | 1.36 | 4022 | 627 | .07 | .10 | good |
| ¼ | 9 | 1" | 1.5 | 1.8 | 850 | 193 | 315 B | 1.46 | 4301 | 670 | .05 | .15 | fair |

TABLE VIII

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 9/32 | 9 | 1" | .8 | 1.1 | 825 | 188 | 230 | 1.38 | 3227 | 503 | .03 | .10 | fair |
| 9/32 | 9 | 1" | 1.0 | 1.3 | 975 | 222 | 285 A | 1.53 | 3561 | 555 | .06 | .11 | good |
| 9/32 | 9 | 1" | 1.2 | 1.5 | 1025 | 233 | 285 | 1.72 | 4022 | 627 | .06 | .14 | good |
| 9/32 | 9 | 1" | 1.4 | 1.7 | 1100 | 250 | 342 | 1.84 | 4301 | 670 | .10 | .15 | very good |

TABLE IX

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 5/16 | 9 | 1" | .8 | 1.1 | 850 | 193 | 226 B | 1.67 | 3227 | 503 | .05 | .10 | fair |
| 5/16 | 9 | 1" | 1.0 | 1.3 | 950 | 216 | 266 C | 1.85 | 3561 | 555 | .05 | .14 | very good |
| 5/16 | 9 | 1" | 1.2 | 1.5 | 1075 | 244 | 324 | 2.09 | 4022 | 627 | .08 | .14 | good |
| 5/16 | 9 | 1" | 1.4 | 1.7 | 1100 | 250 | 428 | 2.23 | 4301 | 670 | .07 | .14 | fair |

TABLE X

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 7/32 | 10 | 1" | 1.0 | 1.3 | 900 | 204 | 230 | .96 | 3723 | 647 | .02 | .10 | fair |
| 7/32 | 10 | 1" | 1.1 | 1.5 | 700 | 159 | 285 | 1.00 | 3872 | 673 | .05 | .10 | fair |
| 7/32 | 10 | 1" | 1.3 | 1.7 | 800 | 182 | 260 | 1.08 | 4161 | 724 | .05 | .15 | poor |
| 7/32 | 10 | 1" | 1.5 | 1.9 | | | can pack too tight to allow separation to operate | | | | .05 | .15 | poor |

TABLE XI

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| ¼ | 10 | 1" | 1.1 | 1.5 | 750 | 170 | 244 | 1.31 | 3872 | 673 | .04 | .10 | poor |
| ¼ | 10 | 1" | 1.3 | 1.7 | 825 | 188 | 272 | 1.41 | 4161 | 724 | .09 | .15 | fair |
| ¼ | 10 | 1" | 1.5 | 1.9 | 875 | 199 | 292 | 1.50 | 4432 | 771 | .07 | .14 | fair |
| ¼ | 10 | 1" | 1.7 | 2.2 | 875 | 199 | 333 | 1.59 | 4685 | 815 | .05 | .14 | fair |

TABLE XII

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 9/32 | 10 | 1" | 1.0 | 1.3 | 825 | 188 | 240 | 1.60 | 3723 | 647 | .02 | .09 | fair |
| 9/32 | 10 | 1" | 1.2 | 1.5 | 900 | 204 | 300 | 1.72 | 4022 | 699 | .03 | .09 | fair |
| 9/32 | 10 | 1" | 1.4 | 1.7 | 925 | 210 | 324 | 1.84 | 4301 | 748 | .05 | .15 | fair |
| 9/32 | 10 | 1" | 1.6 | 1.9 | 1000 | 227 | 363 | 1.96 | 4563 | 793 | .05 | .14 | fair |

TABLE XIII

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 5/16 | 10 | 1" | 1.0 | 1.3 | 775 | 176 | 272 | 1.93 | 3723 | 647 | .05 | .10 | very good |
| 5/16 | 10 | 1" | 1.2 | 1.5 | 925 | 210 | 315 | 2.09 | 4022 | 699 | .05 | .11 | very good |
| 5/16 | 10 | 1" | 1.4 | 1.7 | 950 | 216 | 352 | 2.23 | 4301 | 748 | .05 | .12 | good |
| 5/16 | 10 | 1" | 1.6 | 1.9 | 950 | 216 | 428 | 2.37 | 4563 | 793 | .05 | .12 | good |

TABLE XIV

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 11/32 | 10 | 1" | .9 | 1.2 | 975 | 222 | 285 A | 2.17 | 3400 | 591 | .09 | .14 | good |
| 11/32 | 10 | 1" | 1.1 | 1.4 | 1025 | 233 | 292 | 2.38 | 3723 | 647 | .10 | .15 | better |
| 11/32 | 10 | 1" | 1.3 | 1.6 | 1100 | 250 | 342 | 2.66 | 4161 | 724 | .10 | .16 | best |
| 11/32 | 10 | 1" | 1.5 | 1.8 | 1150 | 261 | 352 | 2.75 | 4301 | 748 | .10 | .16 | fair |

TABLE XV

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 5/16 | 11 | 1" | 1.0 | 1.2 | 750 | 170 | 307 | 1.85 | 3561 | 680 | .05 | .15 | poor |
| 5/16 | 11 | 1" | 1.2 | 1.4 | 900 | 204 | 342 | 2.01 | 3872 | 739 | .05 | .16 | poor |
| 5/16 | 11 | 1" | 1.4 | 1.6 | 900 | 204 | 352 | 2.16 | 4161 | 794 | .05 | .15 | poor |
| 5/16 | 11 | 1" | 1.6 | 1.8 | 975 | 222 | 413 A | 2.30 | 4432 | 846 | .10 | .16 | poor |

TABLE XVI

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 11/32 | 11 | 1" | .9 | 1.1 | 825 | 188 | 260 | 2.17 | 3400 | 649 | .05 | .15 | fair |
| 11/32 | 11 | 1" | 1.1 | 1.3 | 875 | 199 | 315 | 2.38 | 3723 | 711 | .05 | .16 | fair |
| 11/32 | 11 | 1" | 1.3 | 1.5 | 1075 | 244 | 352 | 2.57 | 4022 | 768 | .05 | .10 | good |
| 11/32 | 11 | 1" | 1.5 | 1.7 | 1075 | 244 | 375 | 2.75 | 4301 | 821 | .05 | .11 | good |

TABLE XVII

| Jet Dia. | Jet Degree | Jet Centers | Static Pr. O.E. | Static Pr. C.E. | CPM Rate | Can Train or Column Speed FPM | Single Can Speed FPM | Avg. CFM Per Jet | Avg. Vel Pet Jet | Avg. Vector Vel | SP BTN Can | SP AT Can | Remarks |
|---|---|---|---|---|---|---|---|---|---|---|---|---|---|
| 3/8 | 11 | 1" | .9 | 1.1 | 1100 | 250 | 342 | 2.61 | 3400 | 649 | .10 | .20 | good |
| 3/8 | 11 | 1" | 1.1 | 1.4 | 1200 | 273 | 363 | 2.86 | 3723 | 711 | .10 | .20 | good |
| 3/8 | 11 | 1" | 1.3 | 1.6 | 1250 | 284 | 400 | 3.09 | 4022 | 768 | .10 | .20 | very good |
| 3/8 | 11 | 1" | 1.5 | 1.8 | 1250 | 284 | 428 | 3.31 | 4301 | 821 | .15 | .20 | fair |

TABLE XVIII

Cans per Minute and Train Speed vs. Single Can Speed Data

| CPM | Train FPM | Single FPM | Table No. | Item |
|---|---|---|---|---|
| 975 | 222 | 187 | III | A |
| 975 | 222 | 206 | III | A |
| 975 | 222 | 226 | III | A |
| 975 | 222 | 333 | IV | A |
| 975 | 222 | 285 | VIII | A |
| 975 | 222 | 285 | XIV | A |
| 975 | 222 | 413 | XV | A |
| 850 | 193 | 230 | IV | B |
| 850 | 193 | 226 | IX | B |
| 850 | 193 | 255 | VI | B |
| 850 | 193 | 315 | VII | B |

TABLE XIX

| Stage | CPM | FPM | CPF | Space Occupied by Can-Inch | Space Between Cans-Inch |
|---|---|---|---|---|---|
| 1 | 140 | 488 | 2.0 | 5.25 | 6¾ |
| 2 | 280 | 390 | 2.5 | 6.56 | 2¾ |
| 3 | 420 | 325 | 3.0 | 7.87 | 2 |
| 4 | 560 | 279 | 3.5 | 9.18 | 15/16 |
| 5 | 700 | 244 | 4.0 | 10.5 | ½ |
| 6 | 840 | 232 | 4.2 | 11.02 | ¼ |
| 7 | 980 | 222 | 4.4 | 11.55 | 7/64 |

Figure 7:
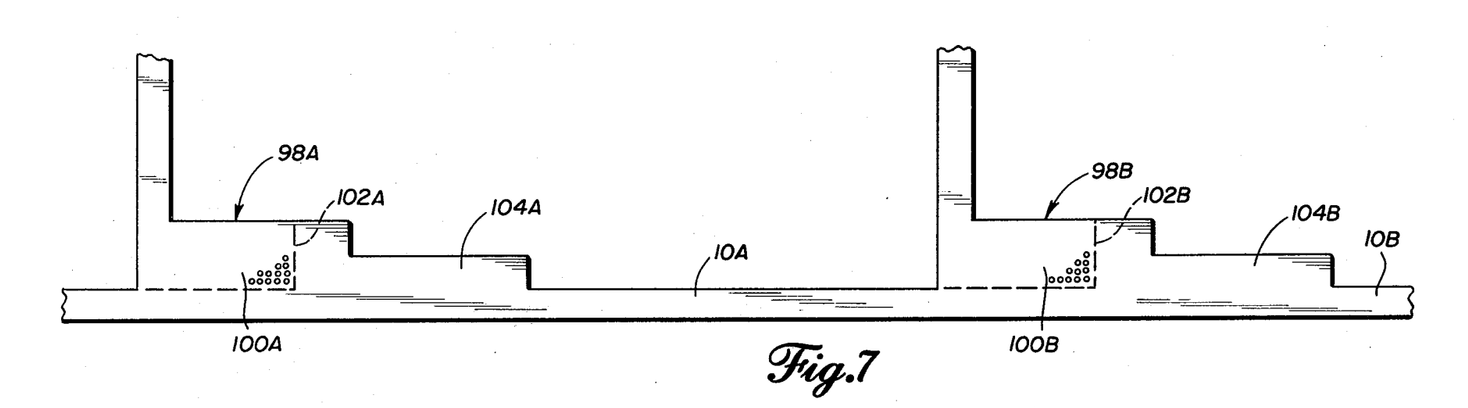

Another use of the conveyor of the present invention will now be illustrated. Where a large number of cans or containers are moved from a mass storage or from several sources to be fed in a single file, an Air Single Filer apparatus can be used such as that covered in applicant's copending application Ser. No. 869,371, filed Jan. 13, 1978, for AIR OPERATED CONVEYOR APPARATUS. As illustrated diagrammatically in FIG. 7, a series of Air Single Filer conveyors 98A and 98B are serially connected and each conveyor is receiving, for example, 140 cans per minute to be merged together and provide a feed of 140n cans per minute from the last conveyor where n is the number of Air Single Filers or can streams to be merged. The first Air Single Filer 98A is fed 140 cans per minute and delivers 140 cans per minute to a conveyor 10A of this invention. The conveyor 10A is provided with jet opening sizes and angles and operating conditions to provide approximately 2 cans per foot with each can traveling at about 488 feet per minute, Table XIX. The output from conveyor 10A is merged with the throughput of another Air Single Filer 98B with an infeed of about 140 cans per minute and delivers 280 cans per minute to conveyor 10B. The conveyor 10B is provided with jet opening sizes, angle and operating conditions to provide about 2½ cans per foot traveling at 390 feet per minute. The output from conveyor 10B is merged with the throughput of another Air Single Filer 98C, not shown, having an infeed of about 140 cans per minute and delivers 420 cans per minute to conveyor 10C, not shown. The conveyor 10C is provided with jet opening sizes, angles and operating conditions to provide about 3 cans per foot traveling at 325 feet per minute. The output from conveyor 10C is merged with the throughput of still another Air Single Filer 98D, not shown, having an infeed of about 140 cans per minute and delivers 560 cans per minute at approximately 279 feet per minute. Thus, it is seen that the conveyor of this invention can be tailored by selection of jet opening size, angle and operating conditions to perform merging operations as well as accumulator operations between other pieces of equipment. The positive pressure between the cans of about 0.02 inches of water or 0.00072 psi in each section 10A–10B and the like will be uniform throughout the length of each section but may be different from section to section. Table XIX sets forth the geometry of the conveyor system referred to above using cans that are 2.625 inches in diameter. The Air Single Filer 98A and 98B is shown as a first 2 foot section 100A and 100B with a portion 102A and 102B of the side walls perforated, shown dotted, for container control with jets at an angle of 30° and a depth to accommodate 3 container diameters plus ⅜ inch. The second section 104A and 104B, also 2 feet, has jets at an angle of 20° and a depth to accommodate 2 container diameters plus ⅜ inch. The conveyor 10A is shown as utilizing 10° jet angles and may be of any convenient length. The height in conveyor 10A will accommodate only one container diameter as described above.

It will also be appreciated that the air jet nozzles may be of variable angles as set forth in applicant's copending application such that different angular settings may be made as well as providing for selectively changing the angle of one or more jet nozzles during use as by means of microprocessor control and the like.

While there has been described what at present are considered to be the preferred embodiments of the invention, it will be obvious to those skilled in the art that various changes and modifications may be made therein without departing from the invention. It is aimed therefore in the appended claims to cover all such changes and modifications which fall within the true spirit and scope of the invention.

What is claimed is:

1. An air conveyor for the transfer of containers from one location to another while substantially avoiding contact therebetween which comprises:
   a pair of elongated side walls held in spaced relation to define a channel with the side walls being spaced apart a distance slightly greater than the height of the container;
   a top cooperating with the side walls to define an inverted U-shaped channel;
   a plenum adapted to be connected to a source of air under pressure attached to either side wall in coextensive relation;
   a plurality of openings through the side walls communicating the plenums with the channel and positioned essentially parallel to the lower extremity of the side walls, said openings comprising air jet nozzles angularly disposed to direct jets of air from said plenum forwardly against the containers and at a point just above the axis of rotation of the containers at rest; and,
   the lower extremity of the U-shaped channel being open with guide rails attached to either side wall and spaced from the top a distance slightly greater than the diameter of the container to be worked upon, said channel being adapted to coact with the air from said nozzles and with the containers to establish and maintain a greater than ambient pressure of at least 0.02 inches of water or 0.00072 psi between adjacent containers.

2. The conveyor of claim 1 wherein said air jet nozzles are angularly positioned at an angle of from between about 5° to about 50° from a line normal to the side wall in the direction of container travel.

3. The conveyor of claim 2 wherein the angle of the air jet nozzle is preferably in the range of from about 8° to about 11° from a line normal to the side wall in the direction of container travel.

4. A method of transporting a plurality of containers which comprises providing an inverted U-shaped channel having side walls and a top with cross sectional dimensions just slightly greater than the profile of the container to provide an effective air seal therebetween and the sides and top of the channel, introducing containers into the channel while injecting air through longitudinally spaced jet openings in the side walls positioned at a downstream angle to impinge on the ends of the container and introducing air under pressure into the space between and above the containers while exhausting air from between and above the containers and from the channel through an open bottom at a rate to provide and maintain a positive pressure of at least 0.02 inches of water between and above the containers sufficient to maintain the containers separated one from another while being transported.

5. The method of claim 4 wherein the introduction of air between the containers is sufficient to provide a greater than ambient pressure therebetween.

6. The method of claim 4 wherein the air is introduced into the channel at an angle of from about 5° to about 50° with respect to a line normal to the side wall in the direction of container travel.

7. The method of claim 6 wherein the air jet angle is preferably in the range of from about 8° to about 11°.

8. The method of claim 4 wherein supplemental air is introduced into the space between the containers in addition to air supplied via the air jet nozzles.

9. The conveyor according to claim 1 wherein the air volume supplied to the inlet of the plenum in relation to the total cross sectional area of the air jet nozzles along with the static pressure to be maintained across the jet nozzles are selected to provide a substantially uniform static pressure in the channel throughout its length.

10. The method of claim 7 wherein the air jet nozzles are of a uniform size of from about 7/32 to about 11/32 inch in diameter.

11. The conveyor of claim 1 wherein said air jet nozzles are selectively positioned at different angles along the length of the conveyor.

12. The method of claim 7 wherein the air jet nozzles are of differing sizes and angles along the length of the conveyor.

13. The conveyor of claim 1 wherein the space between the cans and the top of the channel is not greater than about ¼ inch.

14. The method of claim 4 including the step of maintaining a spacing between the top of the channel and the container of not greater than about ¼ inch.

15. In an air conveyor system for merging a plurality of streams of containers into a single feed line which comprises a plurality of a first single filer means each receiving a plurality of containers in mass at its input and discharging the containers serially in a single file at its output, a conveyor adapted to receive the containers from one single filer and discharge the containers to the second single filer at predetermined speed and spacing to accommodate the containers received by the second single filer and merge same with the output of the first single filer, in which the air conveyor comprises:

- a pair of elongated side walls held in spaced relation to define a channel with the side walls being spaced apart a distance slightly greater than the height of the container;
- a top cooperating with the side walls to define an inverted U-shaped channel;
- a plenum adapted to be connected to a source of air under pressure attached to either side wall in coextensive relation;
- a plurality of openings through the side walls communicating the plenums with the channel and positioned essentially parallel to the lower extremity of the side walls, said openings comprising air jet nozzles angularly disposed to direct jets of air from said plenum forwardly against the containers and at a point just above the axis of rotation of the containers at rest; and,
- the lower extremity of the U-shaped channel being open with guide rails attached to either side wall and spaced from the top a distance slightly greater than the diameter of the container to be worked upon, said channel being adapted to coact with the air from said nozzle and with the containers to establish and maintain a greater than ambient pressure of at least about 0.02 inches of water or 0.0072 psi between adjacent containers.

16. The conveyor of claim 15 wherein said air jet nozzles are angularly positioned at an angle of from between about 5° to about 50° from a line normal to the side wall in the direction of container travel.

17. The conveyor of claim 16 wherein the angle of the air jet nozzle is preferably in the range of from about 8° to about 11° from a line normal to the side wall in the direction of container travel.

18. A method of merging containers from a plurality of sources which comprise feeding the containers into a plurality of single filer means each adapted to receive a plurality of containers in mass at the input and discharge the containers serially in a single file at its output, providing a series of single filer means, feeding the output of a first single filer means to each next serial single filer means, providing conveyor means to convey containers from the output of a single filer means to the input of the next single filer means which comprises providing an inverted U-shaped channel having side walls and a top with cross sectional dimensions just slightly greater than the profile of the container to provide an effective air seal therebetween and the sides and top of the channel, introducing containers into the channel while injecting air through longitudinally spaced jet openings in the side walls positioned at a downstream angle to impinge on the ends of the container and introducing air under pressure into the space between and above the containers while exhausting air from between and above the containers and from the channel through an open bottom at a rate to provide and maintain a positive pressure between and above the containers sufficient to maintain the containers separated one from another while being transported.

19. The method of claim 18 wherein the introduction of air between the containers is sufficient to provide a greater than ambient pressure therebetween.

20. The method of claim 18 wherein the air is introduced into the channel at an angle of from about 5° to about 50° with respect to a line normal to the side wall in the direction of container travel.

21. The method of claim 20 wherein the air jet angle is preferably in the range of from about 8° to about 11°.

22. The method of claim 18 wherein supplemental air is introduced into the space between the containers in addition of air supplied via the air jet nozzles.

23. The method of claim 21 wherein the air jet nozzles are of a uniform size of from about 7/32 to about 11/32 inch in diameter.

24. The method of claim 21 wherein the air jet nozzles are of differing sizes and angles along the length of the conveyor.

25. The method of claim 18 including the step of maintaining a spacing between the top of the channel and the container of not greater than about ¼ inch.

26. The method of claim 7 wherein the air jet nozzles are of a uniform size of from about ⅛ to about ¾ inch in diameter.

27. The method of claim 21 wherein the air jet nozzles are of a uniform size of from about ⅛ to about ¾ inch in diameter.

* * * * *